United States Patent
Zhang et al.

(10) Patent No.: US 12,367,899 B2
(45) Date of Patent: Jul. 22, 2025

(54) GIMBAL STRUT CONFIGURATION FOR HIGH YAW SUSPENSION DESIGN

(71) Applicant: Magnecomp Corporation, Murrieta, CA (US)

(72) Inventors: Long Zhang, Winchester, CA (US); Kuen Chee Ee, Chino, CA (US); David Glaess, Bangkok (TH)

(73) Assignee: Magnecomp Corporation, Murrieta, CA (US)

( * ) Notice: Subject to any disclaimer, the term of this patent is extended or adjusted under 35 U.S.C. 154(b) by 1 day.

(21) Appl. No.: 18/376,966

(22) Filed: Oct. 5, 2023

(65) Prior Publication Data

US 2024/0029760 A1    Jan. 25, 2024

Related U.S. Application Data

(63) Continuation of application No. 17/504,187, filed on Oct. 18, 2021, now abandoned.

(60) Provisional application No. 63/094,215, filed on Oct. 20, 2020.

(51) Int. Cl.
G11B 5/48    (2006.01)

(52) U.S. Cl.
CPC ............ *G11B 5/4826* (2013.01); *G11B 5/484* (2013.01)

(58) Field of Classification Search
None
See application file for complete search history.

(56) References Cited

U.S. PATENT DOCUMENTS

| | | |
|---|---|---|
| 6,011,671 A | 1/2000 | Masse et al. |
| 6,515,832 B1 | 2/2003 | Girard |
| 7,567,410 B1 | 7/2009 | Zhang et al. |
| 7,898,772 B1 | 3/2011 | Ziaei et al. |
| 8,085,506 B1 | 12/2011 | Ee et al. |
| 8,089,731 B1 | 1/2012 | Ma et al. |
| 8,130,470 B2 | 3/2012 | Muraki et al. |
| 8,208,224 B1 | 6/2012 | Teo et al. |
| 8,310,790 B1 | 11/2012 | Fanslau, Jr. |
| 8,441,761 B1 | 5/2013 | Hahn et al. |
| 8,446,695 B1 | 5/2013 | Ee et al. |
| 8,792,212 B1 | 7/2014 | Pan et al. |
| 8,792,213 B1 | 7/2014 | Vijay et al. |
| 8,879,210 B1 | 11/2014 | Hahn et al. |
| 8,947,831 B1 | 2/2015 | Ee et al. |
| 8,964,334 B2 | 2/2015 | Takikawa et al. |

(Continued)

OTHER PUBLICATIONS

International Search Report and Written Opinion in International Application No. PCT/US2021/055690, mailed Jan. 28, 2022.

(Continued)

*Primary Examiner* — William J Klimowicz
(74) *Attorney, Agent, or Firm* — DLA Piper LLP (US)

(57) ABSTRACT

A trace gimbal is described. The trace gimbal includes outer struts including a front outrigger at a distal end of the trace gimbal and a rear outrigger at a proximal end of the trace gimbal. The front outrigger includes a distal front outrigger and a proximal front outrigger. The rear outrigger includes a distal rear outrigger and a proximal rear outrigger. The trace gimbal also includes a middle strut extending from the distal rear outrigger and adjoining the proximal front outrigger to the rear outrigger. The middle strut extends from a slider tongue adjoining the outer gimbal struts to the slider tongue.

20 Claims, 9 Drawing Sheets

(56) References Cited

U.S. PATENT DOCUMENTS

| | | |
|---|---|---|
| 8,976,491 B1 | 3/2015 | Chen et al. |
| 9,190,086 B1 | 11/2015 | Ee et al. |
| 9,558,768 B1 | 1/2017 | Tsuchiya et al. |
| 10,748,565 B1* | 8/2020 | Nakayama ............ G11B 5/486 |
| 10,783,909 B1 | 9/2020 | Tiller et al. |
| 10,991,388 B1* | 4/2021 | Yamada ............... G11B 5/5582 |
| 11,043,236 B1* | 6/2021 | Pallay .................. G11B 5/4833 |
| 11,176,961 B2 | 11/2021 | Suzuki et al. |
| 11,289,120 B1* | 3/2022 | Pallay ................. G11B 19/2018 |
| 11,308,982 B1 | 4/2022 | Pallay |
| 11,688,421 B2 | 6/2023 | Glaess et al. |
| 11,715,490 B2 | 8/2023 | Ee et al. |
| 11,900,974 B2* | 2/2024 | Kotchaplayuk ........ G11B 5/484 |
| 2007/0188927 A1 | 8/2007 | Zhu et al. |
| 2007/0223143 A1 | 9/2007 | Matsui et al. |
| 2008/0144223 A1 | 6/2008 | Muraki et al. |
| 2008/0278858 A1 | 11/2008 | Ishii et al. |
| 2010/0238581 A1 | 9/2010 | Nakamura et al. |
| 2011/0090600 A1 | 4/2011 | Feng |
| 2011/0096438 A1 | 4/2011 | Takada et al. |
| 2014/0022670 A1 | 1/2014 | Takikawa et al. |
| 2014/0022671 A1 | 1/2014 | Takikawa et al. |
| 2014/0022674 A1 | 1/2014 | Takikawa et al. |
| 2014/0085755 A1 | 3/2014 | Hanya et al. |
| 2014/0168813 A1 | 6/2014 | Tao et al. |
| 2015/0055253 A1 | 2/2015 | Takikawa et al. |
| 2018/0144767 A1 | 5/2018 | Ee |
| 2018/0286457 A1 | 10/2018 | Teramoto et al. |
| 2019/0043531 A1* | 2/2019 | Contreras ............. G11B 5/486 |
| 2019/0066720 A1 | 2/2019 | Yamada et al. |
| 2020/0265866 A1 | 8/2020 | Suzuki |
| 2020/0279579 A1 | 9/2020 | Nakayama et al. |
| 2021/0151073 A1 | 5/2021 | Yamada |
| 2021/0225394 A1 | 7/2021 | Suzuki et al. |
| 2021/0241791 A1 | 8/2021 | Pankaew et al. |
| 2021/0241802 A1 | 8/2021 | Nakayama et al. |
| 2021/0280209 A1 | 9/2021 | Suzuki et al. |
| 2021/0287698 A1 | 9/2021 | Yamada |
| 2021/0390979 A1 | 12/2021 | Ee et al. |
| 2022/0122633 A1 | 4/2022 | Zhang et al. |
| 2023/0128010 A1* | 4/2023 | Phu ...................... G11B 5/4826 360/245.3 |
| 2023/0282229 A1 | 9/2023 | Glaess et al. |
| 2023/0317104 A1 | 10/2023 | Ee et al. |

OTHER PUBLICATIONS

International Preliminary Report on Patentability in International Application No. PCT/US2021/055690, mailed May 4, 2023.
International Search Report and Written Opinion in International Application No. PCT/US2022/016859, dated Jun. 10, 2022.
International Preliminary Report on Patentability in International Application No. PCT/US2022/016859, mailed Aug. 31, 2023.
International Search Report and Written Opinion in International Application No. PCT/US2022/022056, dated Jun. 7, 2022.
International Preliminary Report on Patentability in International Application No. PCT/US2022/022056, mailed Oct. 5, 2023.
Office Action in U.S. Appl. No. 17/504,187, dated Apr. 26, 2022.
Office Action in U.S. Appl. No. 17/504,187, dated Oct. 5, 2022.
Office Action in U.S. Appl. No. 17/504,187, dated Mar. 7, 2023.
Notice of Allowance in U.S. Appl. No. 17/504,187, dated Jul. 6, 2023.
Office Action in U.S. Appl. No. 17/673,683, dated Aug. 16, 2022.
Notice of Allowance in U.S. Appl. No. 17/673,683, dated Feb. 13, 2023.
Office Action in U.S. Appl. No. 17/703,827, dated May 27, 2022.
Office Action in U.S. Appl. No. 17/703,827, dated Jul. 21, 2022.
Office Action in U.S. Appl. No. 17/703,827, dated Oct. 13, 2022.
Notice of Allowance in U.S. Appl. No. 17/703,827, dated Mar. 10, 2023.
Office Action in U.S. Appl. No. 18/207,764, dated Dec. 13, 2023.
Office Action in U.S. Appl. No. 18/207,764, dated Apr. 12, 2024.
Office Action in U.S. Appl. No. 18/207,764, dated Jul. 16, 2024.
Office Action in U.S. Appl. No. 18/196,919, dated Sep. 6, 2024.

* cited by examiner

GIMBAL STRUT CONFIGURATION FOR HIGH YAW SUSPENSION DESIGN

CROSS-REFERENCE TO RELATED APPLICATIONS

This application is a continuation of U.S. application Ser. No. 17/504,187 filed on Oct. 18, 2021, which claims the benefit of U.S. Provisional Application No. 63/094,215 filed on October 2020, which is hereby incorporated by reference in its entirety.

FIELD

This disclosure relates to the field of suspensions for hard disk drives. More particularly, this disclosure relates to the field of gimbal struts on an actuated suspension.

BACKGROUND

In a dynamic disk storage device, a rotating disk is employed to store information. Disk storage devices typically include a frame to provide attachment points and orientation for other components, and a spindle motor mounted to the frame for rotating the disk. A read/write head is formed on a head slider for writing and reading data to and from the disk surface. The head slider is supported and properly oriented in relationship to the disk by a suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the suspension, thus positioning the head slider at a desired height and alignment above the disk which is referred to as the fly height.

Suspensions for disk drives include a load beam and a flexure. The load beam typically includes a mounting region for mounting the suspension to an actuator of the disk drive, a rigid region, and a spring region between the mounting region and the rigid region. The spring region provides a spring force to counteract the aerodynamic lift force generated on the head slider during the drive operation as described above. The flexure typically includes a gimbal region having a slider mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

Disk drive manufacturers continue to develop smaller yet higher storage capacity drives. Storage capacity increases are achieved in part by increasing the density of the information tracks on the disks (i.e., by using narrower and/or more closely spaced tracks). As track density increases, however, it becomes increasingly difficult for the motor and servo control system to quickly and accurately position the read/write head over the desired track. Attempts to improve this situation have included the provision of a another or secondary actuator or actuators, such as a piezoelectric, electrostatic or electromagnetic actuator or fine tracking motor, mounted on the head suspension itself. These types of actuators are also known as dual-stage microactuation devices and may be located at the base plate, the load beam or on the flexure.

Some of these attempts to improve tracking and head slider positioning control have included locating the actuators both at the base plate and on the flexure tongue simultaneously. Typically, this type of suspension uses voice coil and the actuator located at the base plate region for a large motion of the read/write head, while uses the actuator located on the flexure tongue for a desired fine movement to position the read/write head over the tracks of the disk drive.

SUMMARY

A trace gimbal is described. The trace gimbal includes outer struts including a front outrigger at a distal end of the trace gimbal and a rear outrigger at a proximal end of the trace gimbal. The front outrigger includes a distal front outrigger and a proximal front outrigger. The rear outrigger includes a distal rear outrigger and a proximal rear outrigger. The trace gimbal also includes a middle strut extending from the distal rear outrigger and adjoining the proximal front outrigger to the rear outrigger. The middle strut extends from a slider tongue adjoining the outer gimbal struts to the slider tongue.

In some examples of the trace gimbal, at least one microactuator is mounted on the slider tongue. The middle strut can support the slider tongue onto which a read/write head is assembled. The proximal front outrigger may be adjoined to a distal rear outrigger at a first juncture. In some examples of the trace gimbal, the proximal front outrigger includes a first cross-section, and a second cross-section at the first juncture. The second cross-section may be about the same dimension as the first cross-section of the proximal front outrigger.

In some examples of the trace gimbal, the distal rear outrigger includes a cross-section. The middle strut may also include a cross-section, which is about the same dimension as the cross-section of the distal rear outrigger. The middle strut may be adjoined to the slider tongue at a second juncture. In some examples of the trace gimbal, the second juncture includes a cross-section at the middle strut, the cross-section of the second juncture is about the same dimension as the cross-section of the middle strut.

In some examples, the front outrigger, the rear outrigger, and the middle strut adjoin at a mid-strut joint. The mid-strut joint includes a mid-strut length between 0.30 mm and 0.40 mm. The first cross-section and the second cross-section of the front outrigger may be between 0.05 mm and 0.10 mm.

In some examples of the trace gimbal, the cross-section of the distal rear outrigger is between 0.10 mm and 0.20 mm. The front outrigger and the rear outrigger may adjoin at a proximal end of the middle strut.

A suspension including a trace gimbal is also described. The suspension includes outer struts including a front outrigger at a distal end of the trace gimbal and a rear outrigger at a proximal end of the trace gimbal. The front outrigger includes a distal front outrigger and a proximal front outrigger. The rear outrigger includes a distal rear outrigger and a proximal rear outrigger. The suspension also includes a middle strut extending from the distal rear outrigger and adjoining the proximal front outrigger to the rear outrigger. The middle strut extends from a slider tongue adjoining the outer gimbal struts to the slider tongue.

In some examples of the suspension, at least one microactuator is mounted on the slider tongue. The middle strut can support the slider tongue onto which a read/write head is assembled. The proximal front outrigger may be adjoined to a distal rear outrigger at a first juncture. In some examples of the suspension, the proximal front outrigger includes a first cross-section, and a second cross-section at the first juncture. The second cross-section may be about the same dimension as the first cross-section of the proximal front outrigger.

In some examples of the suspension, the distal rear outrigger includes a cross-section. The middle strut may also include a cross-section, which is about the same dimension as the cross-section of the distal rear outrigger. The middle strut may be adjoined to the slider tongue at a second juncture. In some examples of the suspension, the second juncture includes a cross-section at the middle strut, the cross-section of the second juncture is about the same dimension as the cross-section of the middle strut.

In some examples, the front outrigger, the rear outrigger, and the middle strut adjoin at a mid-strut joint. The mid-strut joint includes a mid-strut length between 0.25 mm and 0.40 mm. The first cross-section and the second cross-section of the front outrigger may be between 0.05 mm and 0.10 mm.

In some examples of the suspension, the cross-section of the distal rear outrigger is between 0.10 mm and 0.20 mm. The front outrigger and the rear outrigger may adjoin at a proximal end of the middle strut.

While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail using the following drawings.

DETAILED DESCRIPTION

Figure 1:
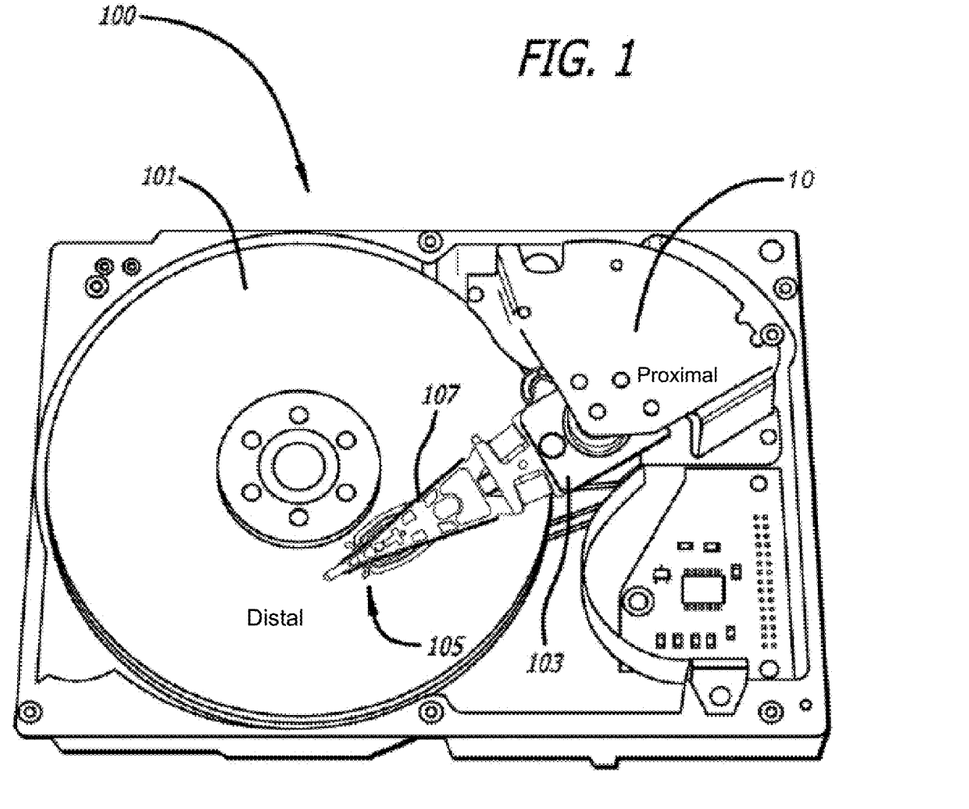
FIG. 1 illustrates a top perspective view of a magnetic disk drive unit including a microactuator dual stage actuation (DSA) suspension, according to an example of the disclosure.

FIG. 1 is a top perspective view of a magnetic disk drive unit 100. The disk drive unit 100 includes a spinning magnetic disk 101, which contains a pattern of magnetic ones and zeroes on it that constitutes the data stored on the disk drive. The magnetic disk 101 is driven by a drive motor. The disk drive unit 100, according to some examples, includes a suspension 105 with a load beam 107, a base plate 103, and a trace gimbal to which a magnetic head slider is mounted proximate the distal end of the trace gimbal. The proximal end of a suspension or load beam is the end that is supported, i.e., the end nearest to a base plate 103 which is swaged or otherwise mounted to an actuator arm. The distal end of a suspension or load beam is the end that is opposite the proximal end, i.e., the distal end is the cantilevered end.

The trace gimbal is coupled to a base plate 103, which in turn is coupled to a voice coil motor 10. The voice coil motor 10 is configured to move the suspension arcuately in order to position the head slider over the correct data track on the magnetic disk 101. The head slider is carried on a gimbal (not shown), which allows the slider to pitch and roll so that it follows the proper data track on the spinning magnetic disk 101, allowing for such variations without degraded performance. Such variations typically include vibrations of the disk, inertial events such as bumping, and irregularities in the disk's surface.

Figure 2A:
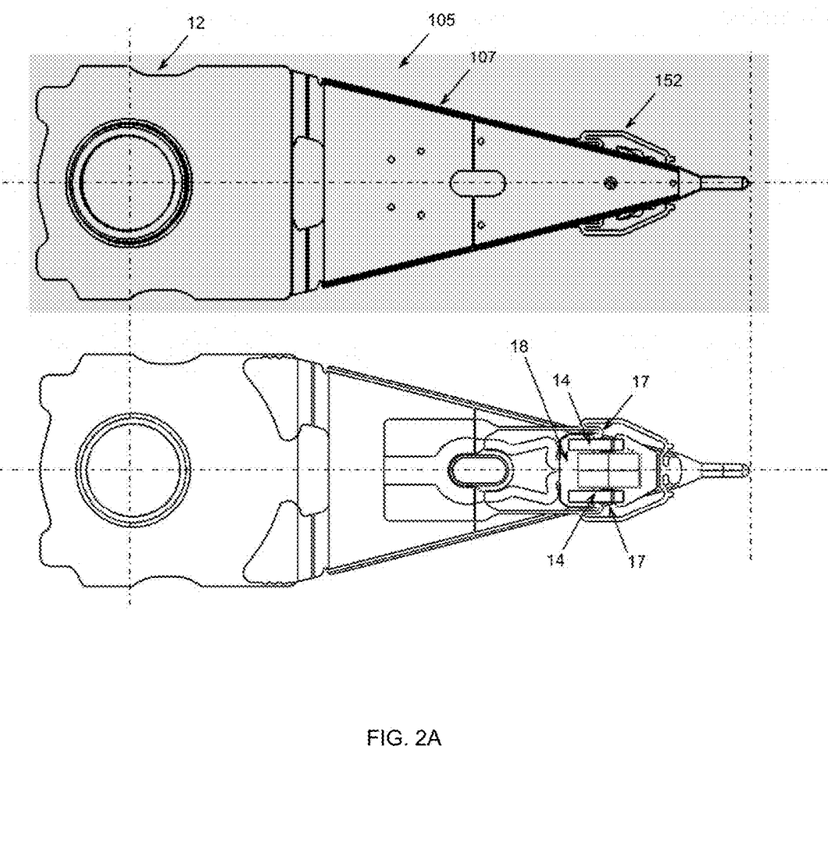
FIG. 2A illustrates a top plan view of a DSA suspension, according to an example of the disclosure.

FIG. 2A is a top plan view of a dual stage actuation suspension 105, in accordance with an example of the disclosure. The DSA suspension 105 can include a base plate 12, and a load beam 107. The load beam 107 includes a trace gimbal 152. The trace gimbal 152 can include mounted actuators and a gimbal assembly. The actuators are operable to act directly on the gimbaled assembly of the DSA suspension 105 that is configured to include the read/write head slider.

The trace gimbal 152 can include at least one actuator joint 17 configured to receive an actuator 14. The base plate 12 illustrates two actuator joints 17, located on opposing sides of the trace gimbal 152. Each actuator joint 17 includes actuator mounting shelves.

Each actuator 14 spans the respective gap in the actuator joint 17. The actuators 14 are affixed to the slider tongue 18 by an adhesive. The adhesive can include conductive or non-conductive epoxy strategically applied at each end of the actuators. The positive and negative electrical connections can be made from the actuators 14 to the trace gimbal 152 by a variety of techniques. When the actuator 14 is activated, it expands or contracts producing movements of the read/write head that is mounted at the distal end of suspension 105 thereby changing the length of the gap between the mounting ends.

Figure 2B:
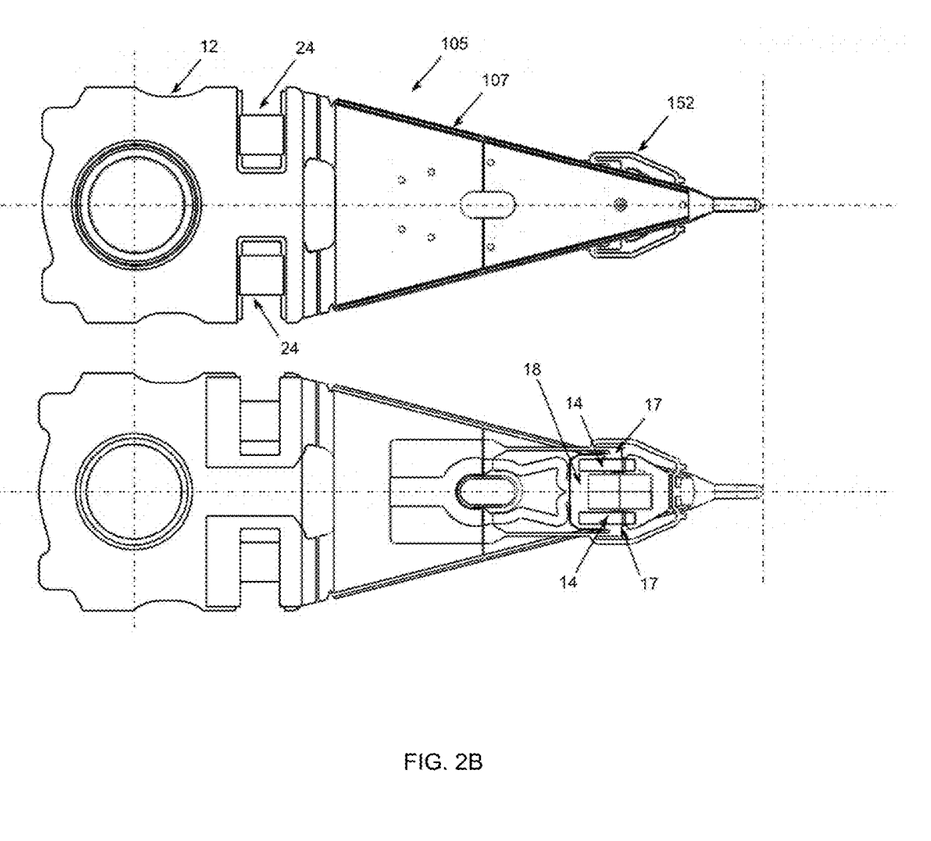
FIG. 2B illustrates a top plan view of a tri-stage actuation (TSA) suspension, according to an example of the disclosure.

The suspension 105 can be configured as a single-stage actuation suspension, a dual-stage actuation device, a tri-stage actuation device or other configurations. One example of the tri-stage actuation suspension is shown in FIG. 2B, where the actuators 14 and 24 are respectively located at the mount plate region and on the flexure tongue at the same time. Conceivably, any variation of actuators can be incorporated onto the suspension 105 for the purposes of the examples disclosed herein. In other words, the suspension 105 may include more or less components than those shown without departing from the scope of the present disclosure. The components shown, however, are sufficient to disclose an illustrative example for practicing the disclosed principles.

Figure 3:
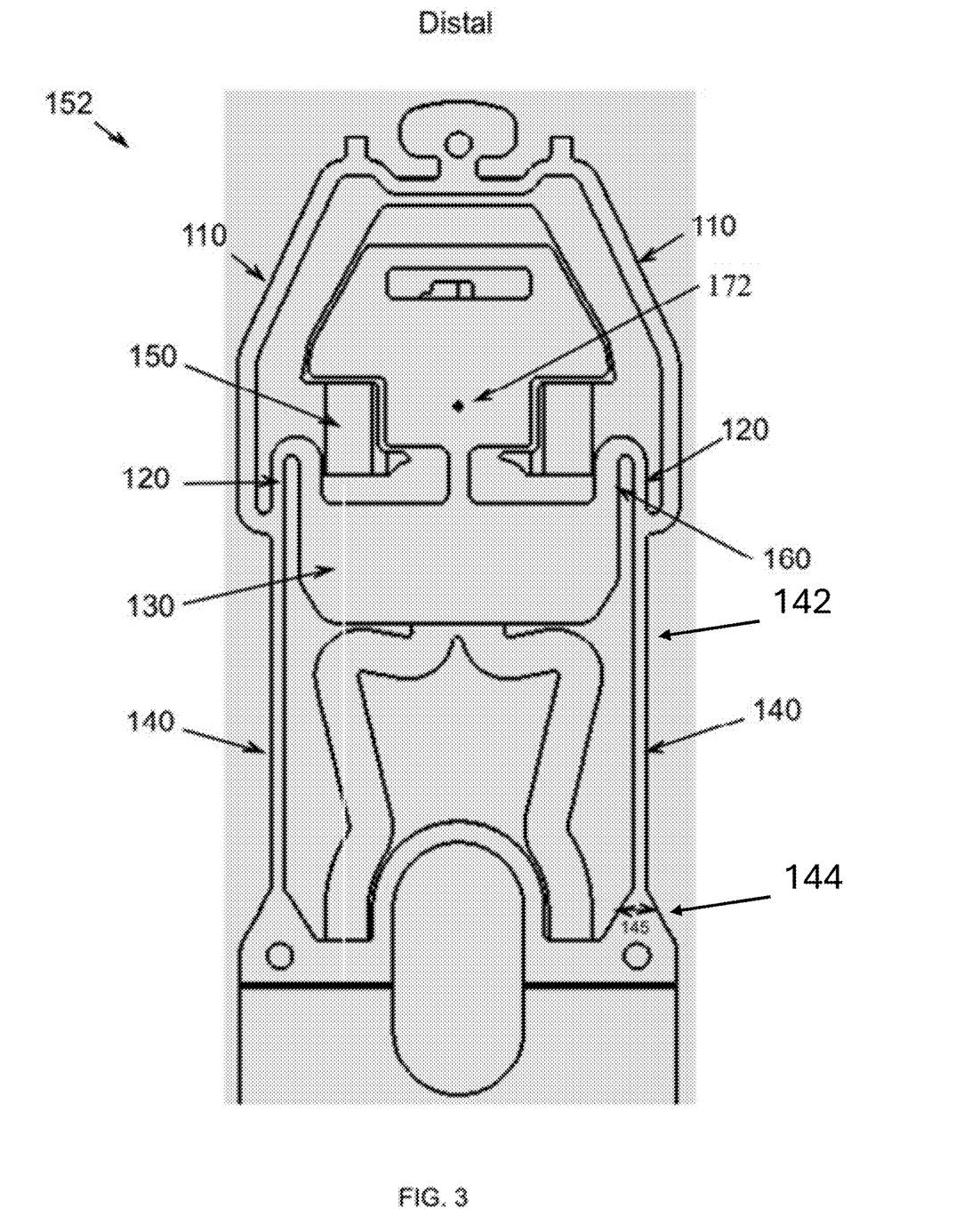
FIG. 3 illustrates a gimbal assembly of the trace gimbal of the suspension of FIG. 2, according to an example.

FIG. 3 illustrates a gimbal assembly of the trace gimbal 152, according to an example. The trace gimbal 152 include at least one microactuator 150 mounted on a slider tongue 130. The trace gimbal 152 includes outer gimbal struts. The outer struts include the front outrigger 110 at a distal end of the trace gimbal 152. The outer struts also include rear outrigger 140 at a proximal end of the trace gimbal 152. The trace gimbal 152 also includes a middle strut 120 extending from the rear outrigger 140 and connecting the front outrigger 110 to the rear outrigger 140. In other words, the front outrigger 110 and the rear outrigger 140 adjoin at the proximal end of the middle strut 120. The trace gimbal 152 also includes an inner strut 160 extending from the slider tongue 130 and connecting the middle strut 120 to the slider tongue 130. The inner strut 160 supports the slider tongue 130 onto which a read/write head is assembled.

The front outrigger 110, the rear outrigger 140, the middle strut 120, and the inner strut 160 (collectively referred to as "struts") are configured to bend when an actuation voltage is applied to the top surface of the microactuator 150, thus actuating the microactuator 150. The struts act as microactuation hinges that flex to allow the distal end of the trace gimbal 152 (and therefore a slider) to move horizontally when the microactuator 150 is actuated. The struts have high lateral stiffness to attain high sway frequency, yet are flexible enough to allow the distal end of the trace gimbal 152 to be rotated about the dimple 172 by operation of microactuator 150. To accomplish this, according to some examples, the struts have varying cross sectional sizes. For example, the struts are bowed and/or bent as shown for example in FIG. 3 to provide flexibility for the microactuator operation. The middle strut 120 and the inner strut 160 are adjoined at a mid-strut joint.

Figure 4:
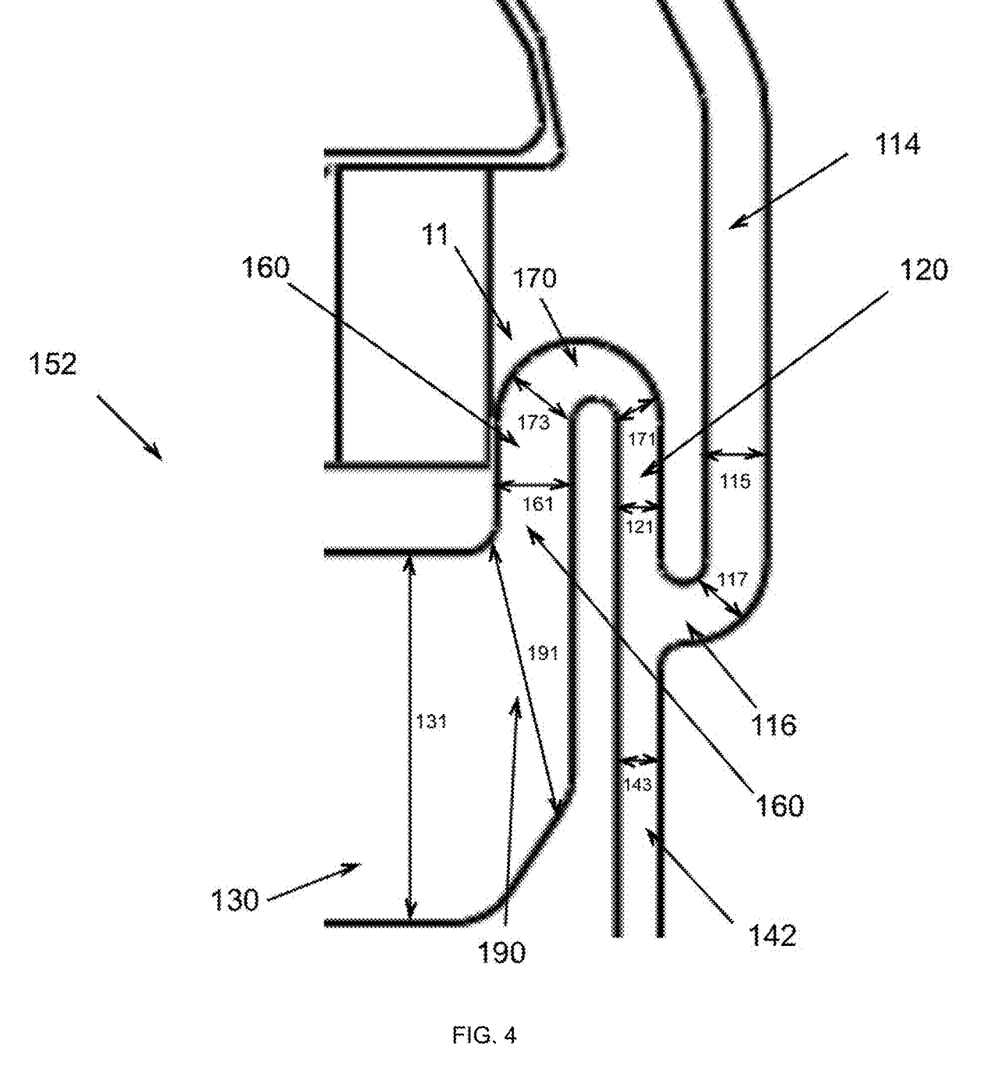
FIG. 4 illustrates a mid-strut joint of the trace gimbal of FIG. 3, according to an example of this disclosure.

FIG. 4 illustrates the mid-strut joint 11 of the trace gimbal 152, according to an example. The mid-strut joint 11 includes a proximal front outrigger 114 adjoined to a distal rear outrigger 142 at a first juncture 116. The proximal front outrigger 114 can include a first cross-section 115, and a second cross-section 117 at the first juncture 116. The second cross-section 117 is equal or larger than the first cross-section 115 of the proximal front outrigger 114. The distal rear outrigger 142 can include a first cross-section 143, while a proximal rear outrigger 144 has a second cross-section 145 (in FIG. 3), larger than the first cross-section 143. The middle strut 120 includes a cross-section 121, which is also smaller than the second cross-section 145 (in FIG. 3) of the proximal rear outrigger 144.

The middle strut 120 is adjoined to the inner strut 160 at a second juncture 170. The second juncture 170 includes a first cross-section 171 at the middle strut 120. The second juncture 170 also includes a second cross-section 173 at the inner strut 160, where the second cross-section 173 is larger than the first cross-section 171. The inner strut 160 includes a cross-section 161. The inner strut 160 is adjoined to the slider tongue 130 at a third juncture 190. The third juncture 190 includes a cross-section 191. The slider tongue 130 includes a cross-section 131, that is larger than the cross-section 191 of the third juncture 190, which is larger than the cross-section 161 of the inner strut 160.

The varying cross-sections of the distal rear outrigger 142, the proximal rear outrigger 144, and the proximal front outrigger 114 impacts the performance of a suspension device with such a trace gimbal 152.

Figure 5:
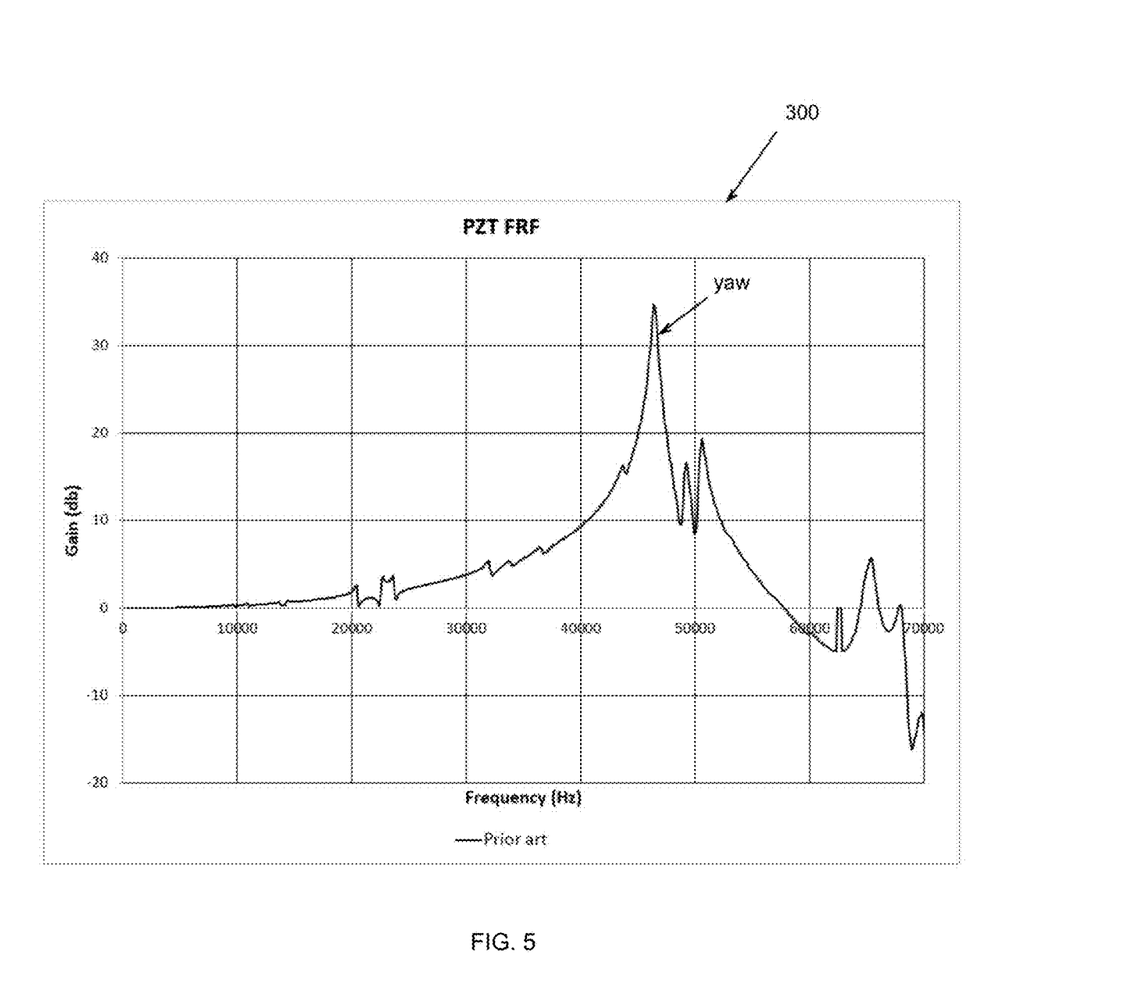
FIG. 5 is a graph of the PZT frequency response function of a suspension incorporating the mid-strut joint of FIG. 4, according to a simulation.

FIG. 5 is a graph 300 of the microactuator (PZT) frequency response function of a suspension incorporating the trace gimbal 152, according to a simulation. The suspension exhibited a yaw frequency below 50 kHz. Because the yaw mode gain is the highest peak across the frequency band of the frequency response function, a deep notch filter is needed to be placed at the yaw mode for its gain attenuation, which sets the limit of the servo bandwidth.

Figure 6:
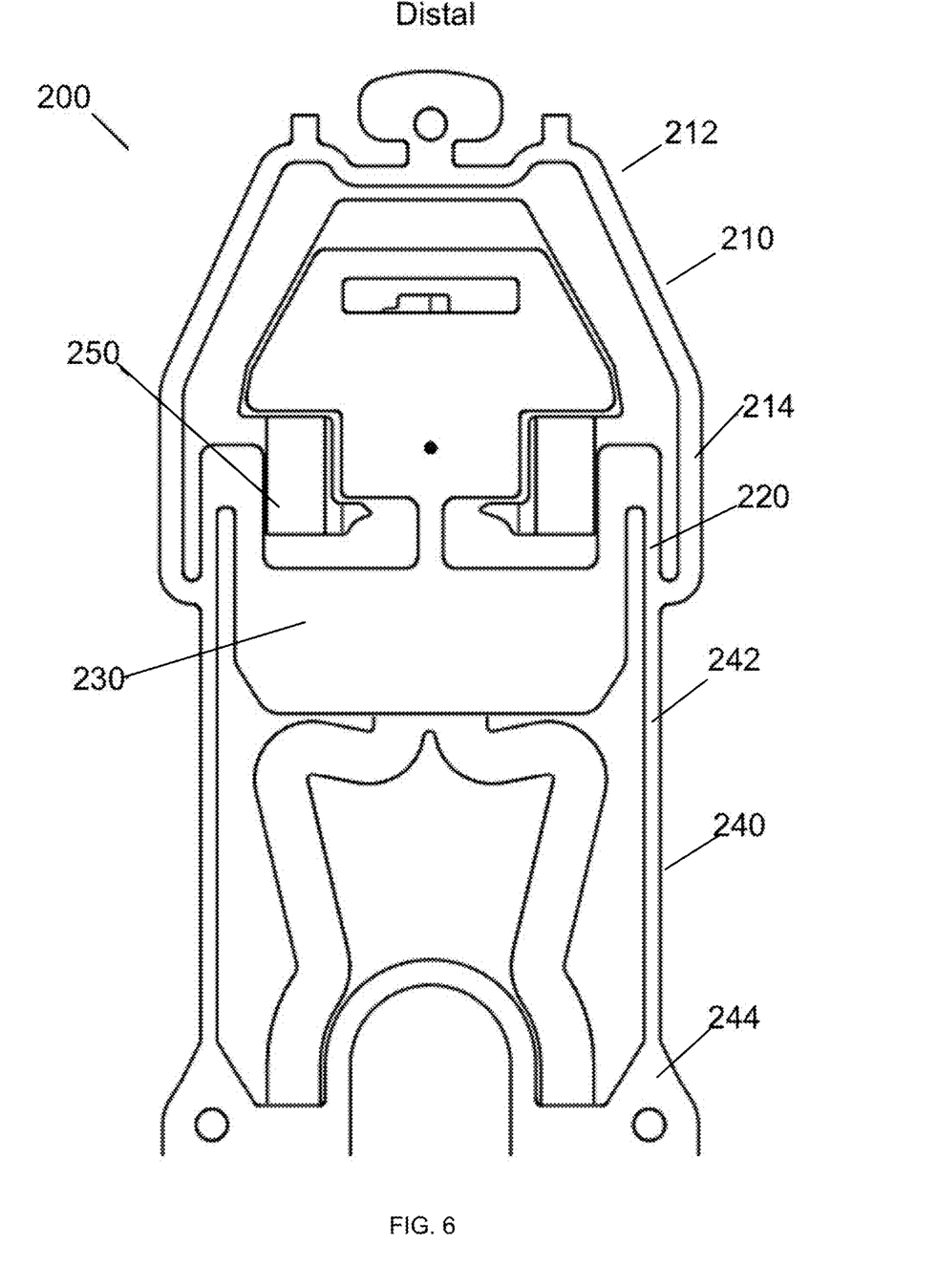
FIG. 6 illustrates a trace gimbal of a suspension, according to an alternative example of the disclosure.

FIG. 6 illustrates a trace gimbal 200 of a suspension, according to an example of the disclosure. The trace gimbal 200 includes at least one microactuator 250 mounted on a slider tongue 230. The trace gimbal 200 includes outer gimbal struts. The outer struts include the front outrigger 210 at a distal end of the trace gimbal 200, the front outrigger 210 includes a distal front outrigger 212 and a proximal front outrigger 214. In some examples, the distal front outrigger 212 and the proximal front outrigger 214 are defined by a bend or non-linear feature of the front outrigger 210. In other examples, the distal front outrigger 212 and the proximal front outrigger 214 are non-distinguishable, and may be adjoined at a linear feature that does not physically separate the two features.

The outer struts also include rear outrigger 240 at a proximal end of the trace gimbal 200, the rear outrigger 240 includes a distal rear outrigger 242 and a proximal rear outrigger 244. In some examples, the distal rear outrigger 242 and the proximal rear outrigger 244 are defined by a bend or non-linear feature of the rear outrigger 240. In other examples, the distal rear outrigger 242 and the proximal rear outrigger 244 are non-distinguishable, and may be adjoined at a linear feature that does not physically separate the two features.

The trace gimbal 200 also includes a middle strut 220 extending from the distal rear outrigger 242 and adjoining the proximal front outrigger 214 to the rear outrigger 240. In other words, the front outrigger 210 and the rear outrigger 240 adjoin at the proximal end of the middle strut 220. The middle strut 220 also extends from the slider tongue 230 adjoining the outer gimbal struts to the slider tongue 230. The middle strut 220 supports the slider tongue 230 onto which a read/write head is assembled. The trace gimbal 200 avoids the bowed and/or bent element of an inner strut 260 with a cross-section 261, thereby improving the stiffness of the trace gimbal 200.

Figure 7:
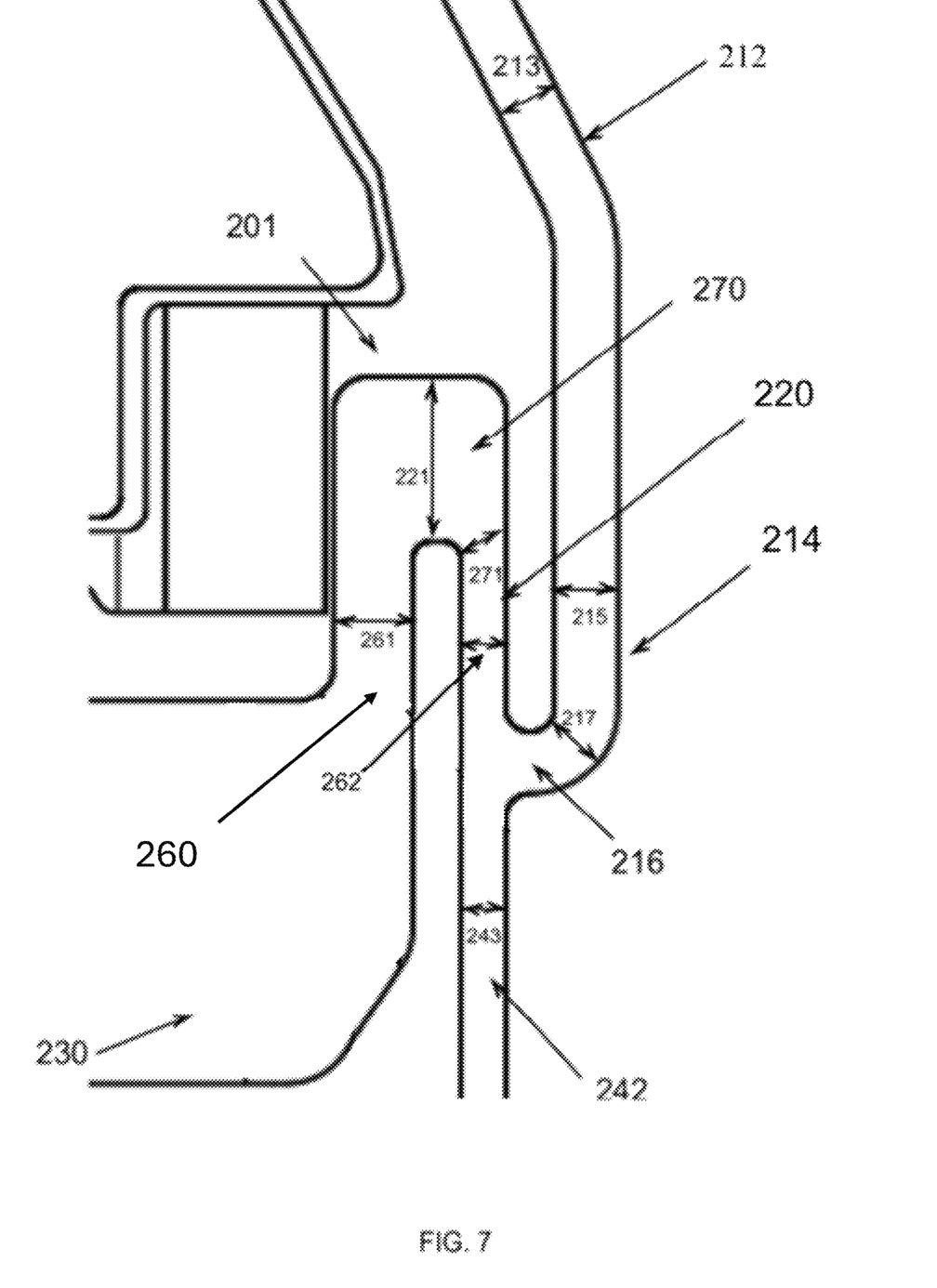
FIG. 7 illustrates a mid-strut joint of the trace gimbal of FIG. 6, according to an example of this disclosure.

FIG. 7 illustrates a mid-strut joint 201 of the trace gimbal 200, according to an example of this disclosure. The mid-strut joint 201 includes a proximal front outrigger 214 adjoined to a distal rear outrigger 242 at a first juncture 216. The proximal front outrigger 214 can include a first cross-section 215, and a second cross-section 217 at the first juncture 216. The second cross-section 217 is about the same dimension as the first cross-section 215 of the proximal front outrigger 214. One of ordinary skill in the art understands that two machined components are rarely the same dimension. Therefore, the dimensions discussed herein with respect to the illustrated examples account for manufacturing tolerances and in practice are not expected to be exact. The distal rear outrigger 242 can include a cross-section 243. The middle strut 220 includes a cross-section 262, which is about the same dimension as the cross-section 243 of the distal rear outrigger 242.

The middle strut 220 is adjoined to the slider tongue 230 at a second juncture 270. The second juncture 270 includes a cross-section 271 at the middle strut 220. The cross-section 271 of the second juncture 270 is about the same dimension as the cross-section 262 of the middle strut 220. The slider tongue 230 includes a mid-strut joint length L 221, that is greater than the cross-section 271 of the second juncture 270.

Specifically, the mid-strut joint 201 may have a mid-strut length L 221 between 0.20 mm and 0.40 mm. In some examples, the mid-strut length L 221 is 0.25 mm. The first cross-section 213 and the second cross-section 215 of the front outrigger 210 is between 0.05 mm and 0.10 mm. In some examples, the width of both cross-sections is 0.09 mm.

The cross-section 243 of the distal rear outrigger 242 is between 0.10 mm and 0.20 mm. In some examples, the width of the cross-section 243 is 0.12 mm. The middle strut 220 connects to the slider tongue 230 at a position that substantially increases the mid strut joint length, compared to the trace gimbal of FIG. 3. In some examples, the mid strut joint length 221 is more than two-times the mid strut joint length of the trace gimbal of FIG. 3.

Figure 8:
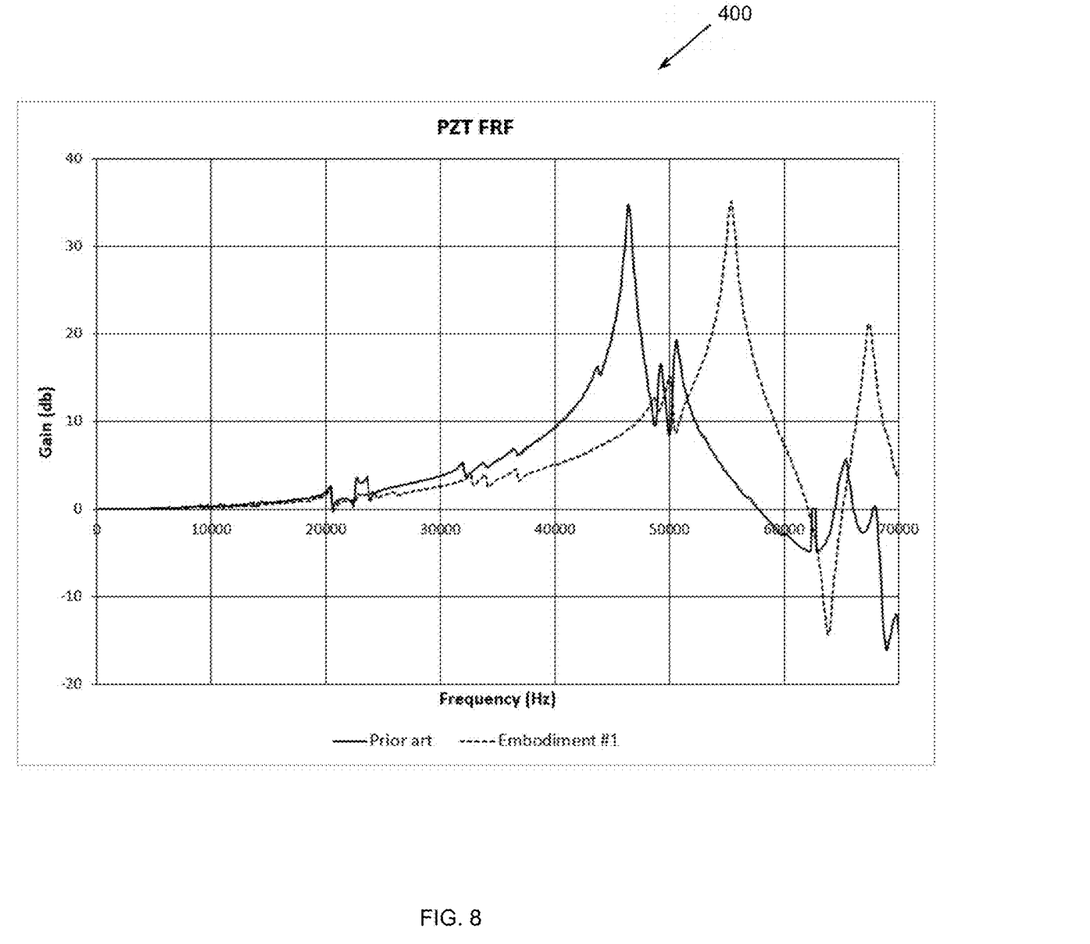
FIG. 8 is a graph of the PZT frequency response function of a suspension incorporating the mid-strut joint of FIG. 6, according to a simulation.

FIG. 8 is a graph 400 of the microactuator (PZT) frequency response function of a suspension incorporating the mid-strut joint of FIG. 7, according to a simulation. The increased mid strut joint length increases the yaw frequency. For example, a 0.1 mm increase in mid strut joint length lead to the yaw frequency increase by 8 kHz to 65.0 kHz. In addition, the mid strut joint length increase also improves the 24 kHz mode (the torsion mode) as it increases its phase lag to decrease the gain.

While multiple examples are disclosed, still other examples within the scope of the present disclosure will become apparent to those skilled in the art from the detailed description provided herein, which shows and describes illustrative examples. Accordingly, the drawings and detailed description are to be regarded as illustrative in nature and not restrictive. Features and modifications of the various examples are discussed herein and shown in the drawings. While multiple examples are disclosed, still other examples of the present disclosure will become apparent to those skilled in the art from the following detailed description, which shows and describes illustrative examples of this disclosure. Accordingly, the drawings and detailed description are to be regarded as illustrative in nature and not restrictive.

What is claimed is:

1. A trace gimbal comprising:
   outer struts including a front outrigger at a distal end of the trace gimbal and a rear outrigger at a proximal end of the trace gimbal, the front outrigger includes a distal front outrigger and a proximal front outrigger, the rear outrigger includes a distal rear outrigger and a proximal rear outrigger; and
   a middle strut extending from the distal rear outrigger and adjoining the proximal front outrigger to the rear outrigger, wherein the middle strut extends from a slider tongue adjoining the outer struts to the slider tongue, wherein the middle strut comprises a mid-strut portion, an inner strut portion, a first juncture connecting the distal rear outrigger and the proximal front outrigger to the mid-strut portion, and a second juncture bent at an angle and disposed between the mid-strut portion and the inner strut portion, wherein the inner strut portion connects the second juncture to the slider tongue, wherein a width of the second juncture is at least double a width of the mid-strut portion and the front outrigger.

2. The trace gimbal of claim 1, further comprising at least one microactuator mounted on the slider tongue, wherein the middle strut supports the slider tongue.

3. The trace gimbal of claim 1, wherein the proximal front outrigger is adjoined to the distal rear outrigger at the first juncture.

4. The trace gimbal of claim 3, wherein the proximal front outrigger includes a first cross-section, and a second cross-section at the first juncture, wherein the second cross-section is about a same dimension as the first cross-section of the proximal front outrigger.

5. The trace gimbal of claim 4, wherein the first cross-section and the second cross-section of the proximal front outrigger is between 0.05 mm and 0.10 mm.

6. The trace gimbal of claim 1, wherein the distal rear outrigger includes a cross-section, wherein the middle strut includes a cross-section, which is about a same dimension as the cross-section of the distal rear outrigger.

7. The trace gimbal of claim 6, wherein the cross-section of the distal rear outrigger is between 0.10 mm and 0.20 mm.

8. The trace gimbal of claim 1, wherein the middle strut is adjoined to the slider tongue at the second juncture, a cross-section of the second juncture is between 0.25 mm and 0.4 mm, which is more than two times of cross-sections of the middle strut and front outrigger.

9. The trace gimbal of claim 1, wherein the front outrigger, the rear outrigger, and the middle strut adjoin at the first juncture, wherein a cross-section of the first juncture is about a same dimension as a cross-section of the middle strut and the front outrigger.

10. The trace gimbal of claim 1, wherein the front outrigger and the rear outrigger adjoin at a proximal end of the middle strut.

11. A suspension comprising:
    a trace gimbal including:
      outer struts including a front outrigger at a distal end of the trace gimbal and a rear outrigger at a proximal end of the trace gimbal, the front outrigger includes a distal front outrigger and a proximal front outrigger, the rear outrigger includes a distal rear outrigger and a proximal rear outrigger; and
      a middle strut extending from a slider tongue adjoining the outer struts to the slider tongue, wherein the middle strut comprises a mid-strut portion, an inner strut portion, a first juncture connecting the distal rear outrigger and the proximal front outrigger to the mid-strut portion, and a second juncture bent at an angle and disposed between the inner strut portion and the mid-strut portion, wherein the inner strut portion connects the second juncture to the slider tongue, wherein a width of the second juncture is at least double a width of the mid-strut portion and the front outrigger.

12. The suspension of claim 11, further comprising at least one microactuator mounted on the slider tongue, wherein the middle strut supports the slider tongue.

13. The suspension of claim 11, wherein the proximal front outrigger is adjoined to the distal rear outrigger at the first juncture.

14. The suspension of claim 13, wherein the proximal front outrigger includes a first cross-section, and a second cross-section at the first juncture, wherein the second cross-section is a same dimension as the first cross-section of the proximal front outrigger.

15. The suspension of claim 14, wherein the first cross-section and the second cross-section of the proximal front outrigger is between 0.05 mm and 0.10 mm.

16. The suspension of claim 11, wherein the distal rear outrigger includes a cross-section, wherein the middle strut includes a cross-section, which is a same dimension as the cross-section of the distal rear outrigger.

17. The suspension of claim 16, wherein the cross-section of the distal rear outrigger is between 0.10 mm and 0.20 mm.

18. The suspension of claim 11, wherein the middle strut is adjoined to the slider tongue at the second juncture, the second juncture includes a cross-section at the middle strut, the cross-section of the second juncture is between 0.25 mm and 0.4 mm, which is more than two times of the cross-section of the middle strut and the front outrigger.

19. The suspension of claim 11, wherein the front outrigger, the rear outrigger, and the middle strut adjoin at the first juncture, which is about a same dimension as cross-sections of the middle strut and the front outrigger.

20. The suspension of claim 11, wherein the front outrigger and the rear outrigger adjoin at a proximal end of the middle strut.

\* \* \* \* \*